United States Patent
Smits et al.

(10) Patent No.: US 8,147,920 B2
(45) Date of Patent: *Apr. 3, 2012

(54) CONTROLLED DEPOSITION AND ALIGNMENT OF CARBON NANOTUBES

(75) Inventors: Jan M. Smits, Littleton, CO (US); Russell A. Wincheski, Williamsburg, VA (US); JoAnne L. Patry, Dulles, VA (US); Anthony Neal Watkins, Hampton, VA (US); Jeffrey D. Jordan, Williamsburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/370,755

(22) Filed: Feb. 13, 2009

(65) Prior Publication Data

US 2009/0233001 A1    Sep. 17, 2009

Related U.S. Application Data

(63) Continuation of application No. 10/730,188, filed on Dec. 4, 2003, now Pat. No. 7,491,428.

(60) Provisional application No. 60/431,022, filed on Dec. 4, 2002.

(51) Int. Cl.
    *B05D 3/14* (2006.01)

(52) U.S. Cl. ........ 427/458; 427/472; 427/301; 427/337; 427/346; 427/348; 977/742; 977/750; 977/842; 977/882; 977/883

(58) Field of Classification Search .................. 427/458, 427/472, 301, 337, 346, 348; 423/445 B; 977/742, 750, 842, 882, 883
See application file for complete search history.

(56) References Cited

U.S. PATENT DOCUMENTS

| | | | | |
|---|---|---|---|---|
| 6,354,133 | B1 * | 3/2002 | Yedur et al. | 73/1.89 |
| 6,630,722 | B1 * | 10/2003 | Aoki | 257/435 |
| 6,630,772 | B1 | 10/2003 | Bower et al. | |
| 7,491,428 | B2 * | 2/2009 | Smits et al. | 427/458 |

OTHER PUBLICATIONS

Chen et al., Applied Physics Letters, vol. 78 (No. 23), Jun. 4, 2001, pp. 3714-3716.*
Chen et al., Applied Physics Letters, vol. 78 (No. 23), pp. 3714-3716.

* cited by examiner

*Primary Examiner* — William Phillip Fletcher, III
(74) *Attorney, Agent, or Firm* — Andrea Z. Warmbier; Robin W. Edwards

(57) ABSTRACT

A carbon nanotube (CNT) attraction material is deposited on a substrate in the gap region between two electrodes on the substrate. An electric potential is applied to the two electrodes. The CNT attraction material is wetted with a solution defined by a carrier liquid having carbon nanotubes (CNTs) suspended therein. A portion of the CNTs align with the electric field and adhere to the CNT attraction material. The carrier liquid and any CNTs not adhered to the CNT attraction material are then removed.

24 Claims, 4 Drawing Sheets

CONTROLLED DEPOSITION AND ALIGNMENT OF CARBON NANOTUBES

ORIGIN OF THE INVENTION

This application is a continuation of U.S. application Ser. No. 10/730,188, filed Dec. 4, 2003, now issued as U.S. Pat. No. 7,491,428 B2, which in turn claims priority to U.S. Provisional Application No. 60/431,022, filed Dec. 4, 2002, the contents of which are incorporated herein in their entirety.

CROSS-REFERENCE TO RELATED APPLICATION

This application is a continuation of U.S. application Ser. No. 10/730,188, filed Dec. 4, 2003, which in turn claims priority to U.S. Provisional Application No. 60/431,022, filed Dec. 4, 2002, the contents of which are incorporated herein in their entirety.

BACKGROUND OF THE INVENTION

Field of the Invention

This invention relates to methods of assembling carbon nanotube devices. More specifically, the invention is a method for the controlled deposition and alignment of carbon nanotubes.

SUMMARY OF THE INVENTION

The present invention is a method for the deposition and alignment of carbon nanotubes. The method uses an assembly comprising a substrate having at least two electrodes supported thereon and opposing one another with a gap region being defined therebetween. A carbon nanotube (CNT) attraction material is deposited on the substrate in at least the gap region. An electric potential is applied to the two electrodes so that an electric field is generated across the gap region between the electrodes. The CNT attraction material is wetted with a solution defined by a carrier liquid having carbon nanotubes (CNTs) suspended therein. As a result, a first portion of the CNTs are aligned with the electric field and adhered to the CNT attraction material, while a second portion of the CNTs are not adhered to the CNT attraction material. The second portion of the CNTs that are not adhered to the CNT attraction material, along with the carrier fluid, are then removed from the assembly.

DETAILED DESCRIPTION OF THE INVENTION

Figure 1:
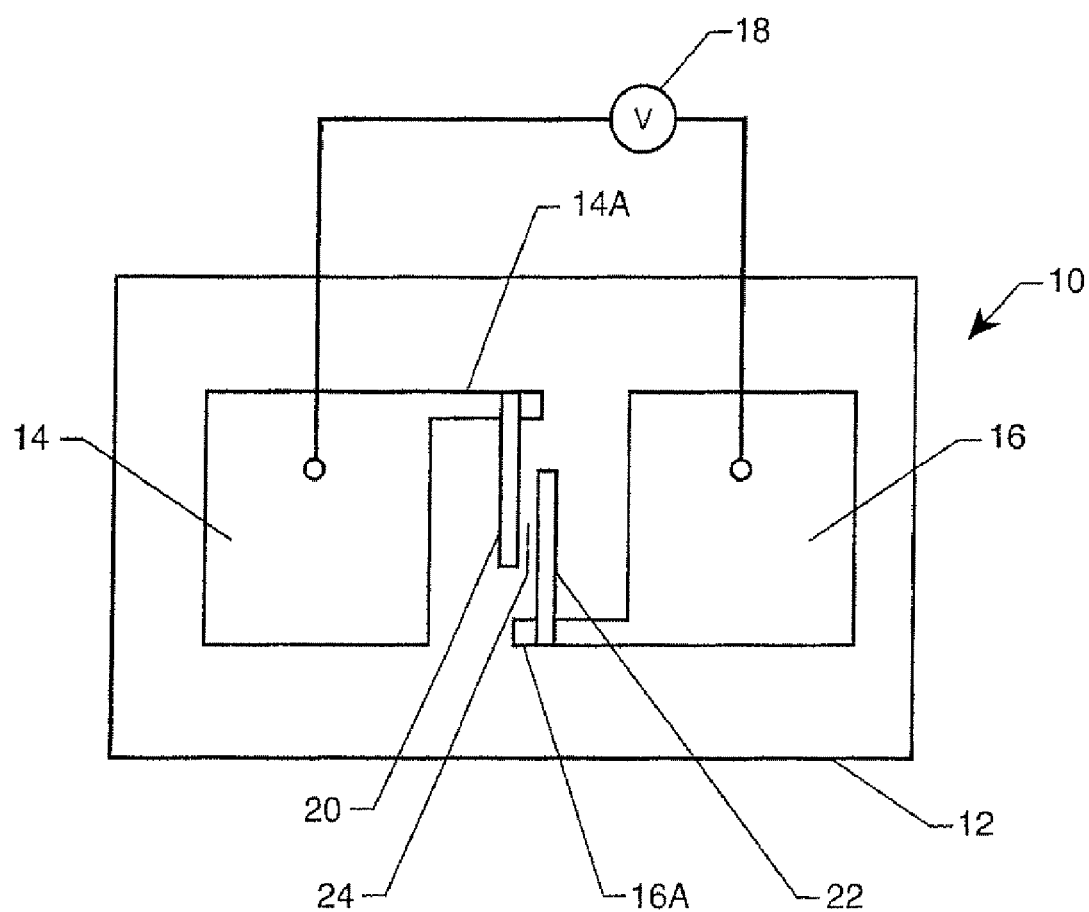
FIG. 1 is a schematic view of an assembly used in the deposition and alignment of CNTs in accordance with the present invention.

Referring now to the drawings, and more particularly to FIG. 1, an assembly used to demonstrate the deposition and alignment of carbon nanotubes (CNTs) in accordance with the present invention is shown and referenced generally by numeral 10. Assembly 10 is shown and will be described herein for purposes of demonstrating the methodology of the present invention. However, it is to be understood that the particular structure and construction of assembly 10 are not limitations of the present invention.

Assembly 10 includes a substrate 12 with spaced-apart electrical contact pads 14 and 16 deposited thereon. For example, in terms of many microcircuit applications, substrate 12 is a silicon wafer and contact pads 14 and 16 are any highly conductive material such as gold. Typically, each of contact pads 14 and 16 has a respective electrode contact leg 14A and 16A extending therefrom such that legs 14A and 15A oppose one another as shown. The particular size and shape of the contact pads and legs can be adapted for a particular application as would be understood by one of ordinary skill in the art. Contact pads 14 and 16 are coupled to a voltage source 18 capable of applying an electrical potential thereto. Voltage source 18 can be an alternating current (AC) or direct current (DC) source without departing from the scope of the present invention.

Electrically coupled to leg 14A is an electrode 20 and electrically coupled to leg 16A is an electrode 22. Electrodes 20 and 22 are deposited on substrate 12 such that portions thereof oppose one another with a gap 24 being defined therebetween. Electrodes 20 and 22 can be, but are not required to be, parallel to one another. Additional opposing pairs of electrodes can be provided without departing from the scope of the present invention.

Figure 4:
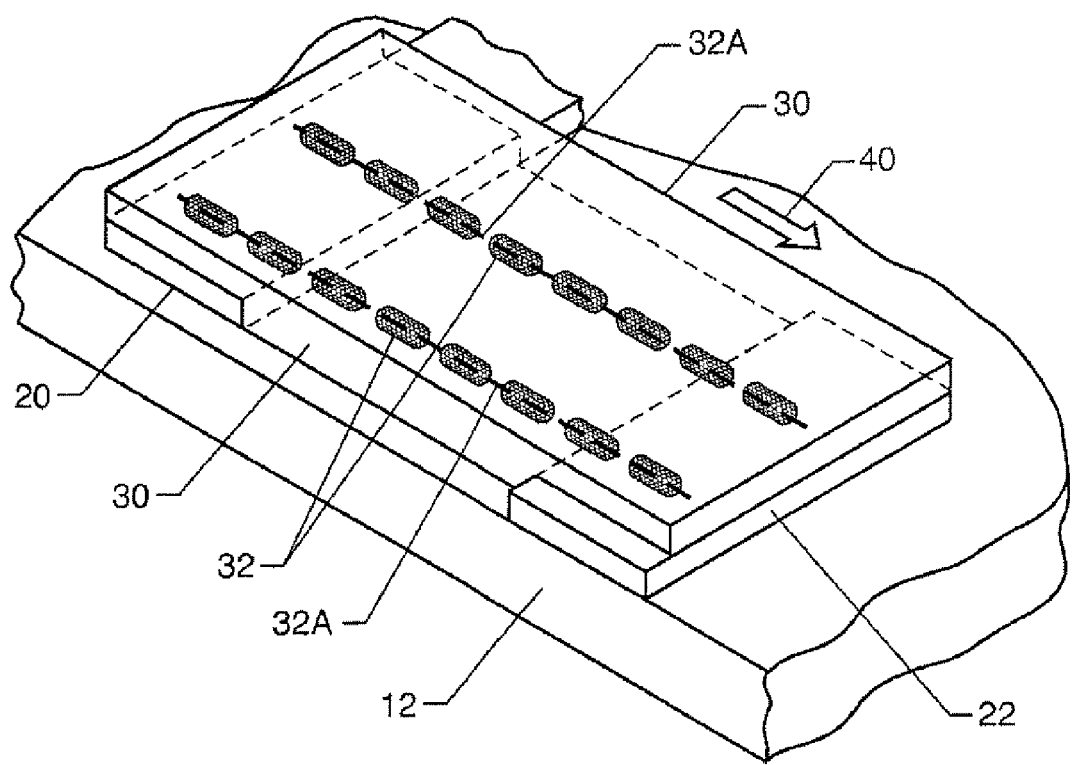
FIG. 4 is a perspective view of a portion of the assembly in FIG. 1 depicting the CNT attraction material with the CNTs being deposited and aligned on and between the assembly's electrodes in accordance with another embodiment of the present invention.

In general, the present invention modifies assembly 10 by (i) specific placement thereon of a material that attracts CNTs thereto, and (ii) deposition and alignment of CNTs on the specifically-placed CNT attraction material such that the CNTs provide good electrical conductivity between aligned CNTs. At a minimum, and as will be explained with reference to FIG. 2, the CNT attraction material is positioned between electrodes 20 and 22, i.e., in gap 24. However, the CNT attraction material can further be deposited on and between electrodes 20 and 22 (and beyond the electrodes if so desired) as will be explained later below with reference to FIG. 4. The CNTs deposited and aligned by the present invention can be single or multiwall CNTs. However, because of their remarkable strength, single-wall CNTs (SWCNTs) will be preferred for most applications.

Figure 2:
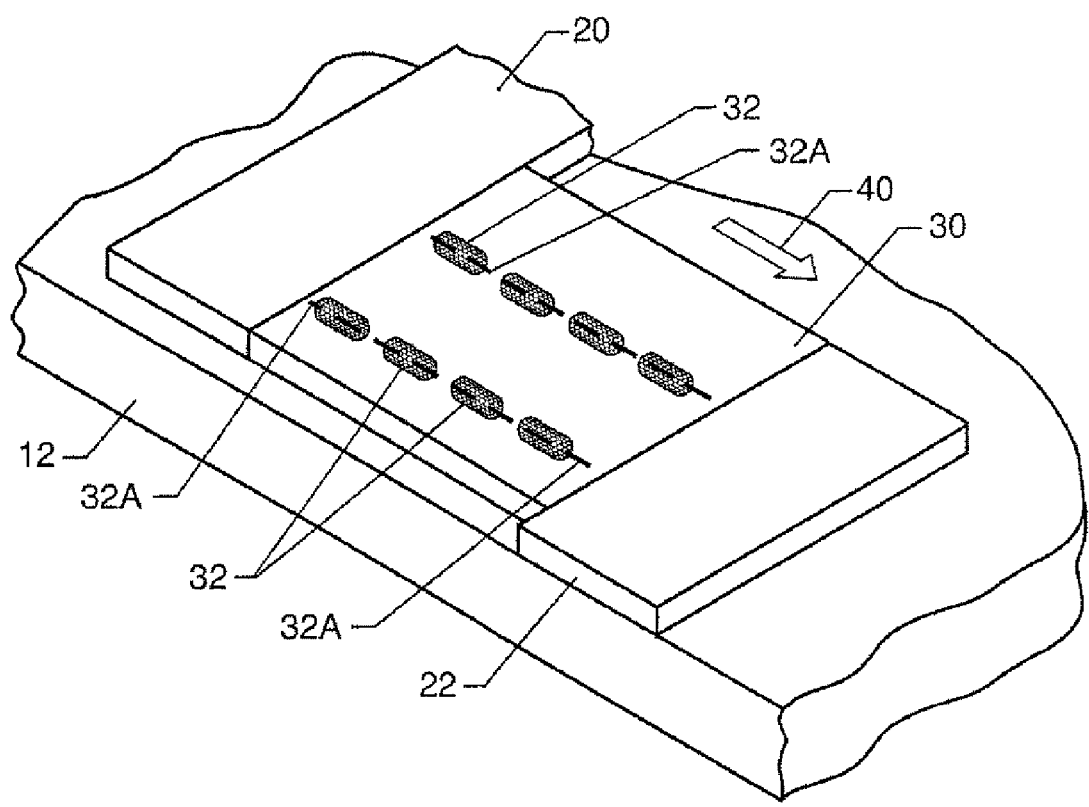
FIG. 2 is a perspective view of a portion of the assembly in FIG. 1 depicting the CNT attraction material and CNTs deposited and aligned between the electrodes of the assembly in accordance with an embodiment of the present invention.

Referring additionally now to FIG. 2, a perspective view of a portion of substrate 12 with electrodes 14 and 16 deposited thereon is shown. In accordance with the present invention, a CNT attraction material 30 is deposited in the gap between opposing portions of electrodes 20 and 22. At least one CNT 32 is coupled to material 30 and aligned such that each tube axis 32A is substantially perpendicular to electrodes 20 and 22 to define an electrical conduction path between aligned ones of CNTs 32. If the ultimate application is to use electrodes 20 and 22 along with aligned CNTs in an electrical conduction path, the aligned ones of CNTs 32 must contact each of electrodes 20 and 22. However, it is to be understood that the present invention does not require that aligned ones of CNTs 32 contact one or both of electrodes 20 and 22. That is, the electrical conduction path defined by aligned ones of CNTs 32 could be used to conduct between elements (not shown) deposited on and/or across aligned ones of CNTs 32.

For clarity of illustration, the size of CNTs 32 is greatly exaggerated and only two sets of aligned CNTs are shown. However, as would be understood by one of ordinary skill in the art, many more sets of aligned CNTs would be present in the actual device. Furthermore, if spacing between electrodes 20 and 22 is small (e.g., less than one micron), it is possible for a single one of CNTs 32 to span between electrodes 20 and 22.

To achieve the structure illustrated in FIG. 2, assembly 10 is first processed to specifically place CNT attraction material 30 in its desired location(s). While a variety of methods can be used to deposit CNT attraction material 30, one method will be described herein by way of an illustrative example. The area of assembly 10 to receive CNT attraction material 30 can be spin coated with a resist material (e.g., poly(methylmethacrylate) or PMMA, polymethylglutarimide, etc.) and then patterned with an electron beam to define the desired "receive" location(s) (e.g., gap 24). After cleaning (e.g., in an oxygen plasma), CNT attraction material 30 is deposited on the surface of assembly 10. The resist material (as well as the portion of CNT attraction material 30 deposited thereon) is then removed (e.g., using standard cleaning procedures) thereby leaving CNT attraction material only in the receive location(s) such as gap 24.

CNT attraction material 30 can be any material that suitably attracts and adheres CNTs thereto. Such a material can have an amino-terminated surface that will form a hydrogen bond with one or more hydrogen molecules found on the sidewall of a CNT. Accordingly, CNT attraction material 30 can be monolayer material such as a self-assembled monolayer (SAM) of amino-terminated moieties. In terms of the structure in FIG. 2 wherein CNT attraction material 30 adheres only to the substrate 12 between electrodes 20 and 22, an example of a commercially-available CNT attraction material is aminopropyltriethoxysilane or APTES. APTES does not bond to metal, which electrodes 20 and 22 may be made of. However, other suitable monolayers can be used without departing from the scope of the present invention. For example, if CNT attraction material 30 is also to be deposited and adhered to electrodes 20 and 22 (as is the case in the structure shown in FIG. 4), a thiol-type of SAM can be used.

In terms of the APTES monolayer, when it comes into contact with a silicon oxide surface (i.e., the surface of a typical substrate 12), it orients itself through a self-assembly process so that the amino (—NH2) head group is pointing away from substrate surface. Several different reactions resulting in different anchoring mechanisms can occur when APTES comes into contact with carboxyl (—COO) and hydroxyl (—OH) groups on the sidewall surface of CNTs. For example, with the correct selection of CNT processing and monolayer selection, a hydrogen bond forms between the monolayer and the carboxyl/hydroxyl group in the sidewall of the CNT. The carboxyl and hydroxyl groups on the nanotube surface contain a partially negative charge, while the amino head-group on the APTES is partially positive. Thus, the charges will attract, and an electrostatic bond can form. Specifically, the electron from the APTES headgroup is partially shared with the carboxyl and/or hydroxyl group on the CNT's surface. Covalent bonds could also be created by performing an aminolysis reaction so that the carboxyl groups will form and amide (—COONH—) linkage with the monolayer, although this would require the use of a catalyst.

As mentioned above, the monolayer does not need to be APTES. Any monolayer that would react with the carboxyl/hydroxyl groups on the CNT sidewall could be selected Examples include monolayers that have a hydroxyl headgroup (e.g., hydrogen bonding with the carboxyl groups and some with the hydroxyl groups) or a carboxyl head-group (e.g., more hydrogen bonding and esterification with the hydroxyl side groups could be performed to create covalent bonds, i.e., a —COOC— bond). Also, choosing monolayers that have no reactive headgroups (e.g., octadecyltrichlorosilane or OTS) can be used to "shield" the surface from nanotube attachment. Finally, the carboxyl/hydroxyl groups on the CNT sidewalls can be modified directly to enhance or prohibit their attachment to surfaces. For example, modifying a CNT so that the sidewall thereof is functionalized with a thiol group (—SH) would cause it to attach to a gold surface.

Figure 3:
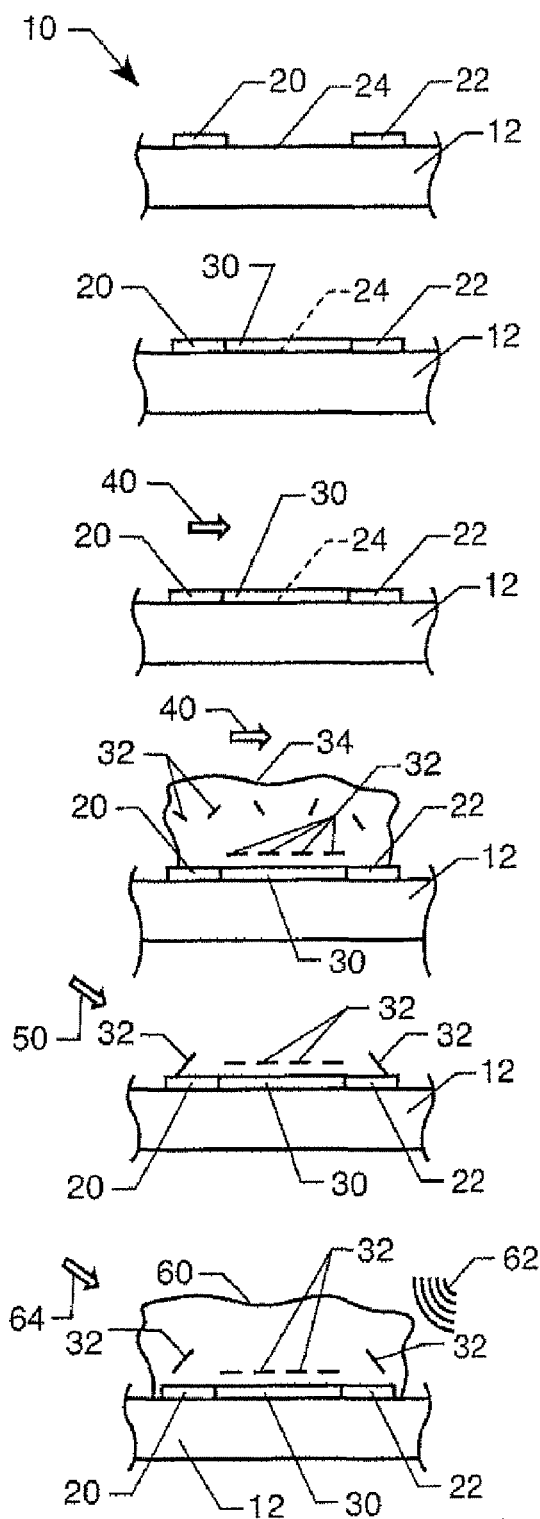
FIG. 3 schematically depicts the sequence of steps and results achieved thereby during the deposition and alignment of CNTs in accordance with the present invention.
Figure 3:
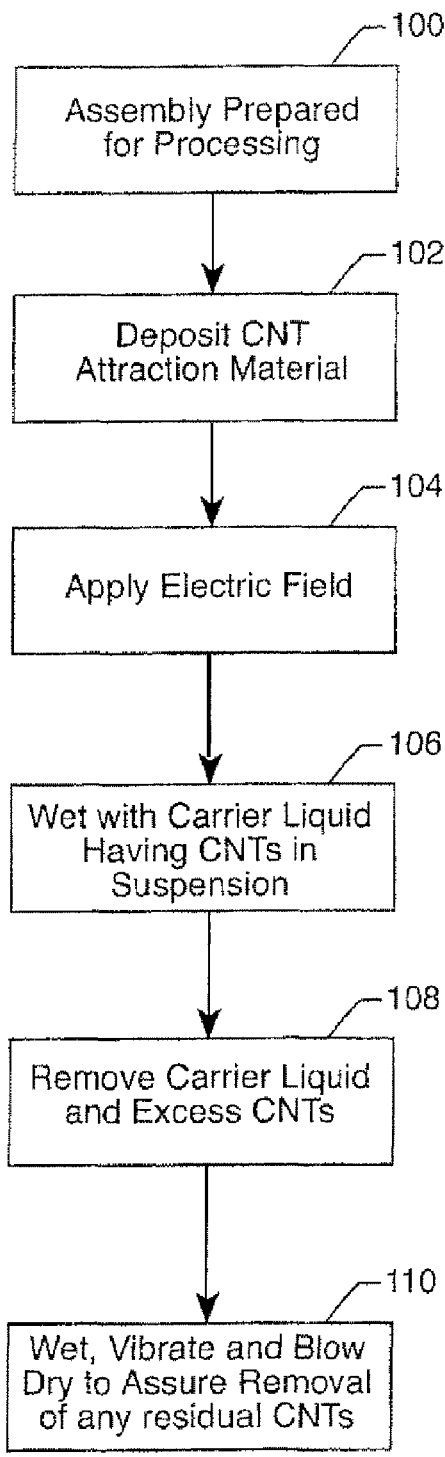

With additional reference now to FIG. 3, the sequence of steps used in the present invention (to create the structure shown in FIG. 2) are characterized in schematic form with a brief description thereof being provided in the corresponding box of the flowchart that is beside the description. For simplicity, a side view of only the relevant portion of assembly 10 is shown at each step in the sequence.

At step 100, assembly 10 is prepared for processing such that electrodes 20 and 22 are placed on substrate 12 with gap 24 defined therebetween. Once CNT attraction material 30 has been deposited in its desired location(s) at step 102, voltage source 18 is activated at step 104 so that an electric field is generated between electrodes 20 and 22 and across CNT attraction material (in gap 24) as indicated by arrow 40. To insure good alignment of CNTs 32 falling between electrodes 20 and 22, it is preferred that voltage source 18 is activated before the deposition of the solution-suspended CNTs 32 at step 106. However, there may be some applications where it is desirable to activate voltage source 18 at the same time as, or just after, the deposition of the solution-suspended CNTs 32. Note that the direction of electric field 40 depends on the polarity of the electric potentials applied to electrodes 20 and 22.

Next, at step 106, a quantity of CNTs 32 suspended in a carrier liquid solution 34 are deposited on assembly 10 on and around CNT attraction material 30. Carrier liquid 34 is chosen so that the CNTs do not clump together. CNTs tend to clump together in solution due to strong van der Waal's forces between individual CNTs. These forces are directly related to the size of the CNTs as well as the distance therebetween. The best solvent to disperse particular CNTs also depends on the origin of the CNTs (e.g., vendor, batch or lot, etc.) and how the CNTs have been processed (e.g., cut with nitric acid to form functionalized sidewalls, purified, etc.). Because of this, several different solvents may be used, such as toluene, n-methylprolidone (NMP), dichloromethane (DCM), dimethylforamide (DMF), and even water that contains various surfactants (e.g., Triton X-100, sodium dodecylsulfate, and many more as would be well understood in the art). In general, the carrier liquid should minimize van der Waal forces between the CNTs suspended therein. Furthermore, when mixing the CNTs in the carrier liquid, ultrasonic energy can be used to help disperse the CNTS therein.

By virtue of this process, those of the solution-suspended CNTs that come into contact with CNT attraction material 30 (i) already have their tube axis 32A substantially aligned with the direction of electric field 40 as illustrated in FIG. 2, and (ii) adhere thereto in an aligned fashion by means of hydrogen bonding with the sidewall of CNTs 32. After a brief period of time (e.g., ranging from tens of second to several minutes with CNT densities being proportional to exposure time), electric field 40 is removed as well as any remaining liquid solution and CNTs not adhered to CNT attraction material 30, thereby leaving CNTs 32 aligned and adhered on CNT attraction material 30 as shown in FIG. 2.

Removal of the liquid carrier and CNTs suspended therein can simply involve the blowing (as indicated by arrow 50 in step 108) of an inert gas such as nitrogen across the surface of assembly 10 (with CNT attraction material 30 and CNTs 32-deposited thereon) until dry. To assure the removal of any CNTs 32 left in areas other than on CNT attraction material 30, additional processing can be implemented at step 110. Specifically, a rinse liquid 60 (e.g., n-methylyrolidone) is washed over the assembly as it is vibrated (e.g., sonification by acoustic wave energy 62) thereby causing the non-adhered ones of CNTs 32 to become suspended in rinse liquid 60. An inert gas (e.g., nitrogen) is then used to blow off the rinse liquid and suspended CNTs as indicated by arrow 64. As a result, the structure illustrated in FIG. 2 is achieved. The method provides for the controlled deposition and alignment of CNTs such that their electrical conductive properties can be exploited.

As mentioned above, and as shown in FIG. 4, the final product produced by the present invention could have CNT attraction material 30 deposited on electrodes 20 and 22 as well as therebetween. This is achieved by proper selection of CNT attraction material 30 for adherence to (metal) electrodes 20 and 22. In this example, CNTs 32 will be adhered to and aligned on CNT attraction material 30 both over and between electrodes 20 and 22. The processing steps for achieving this structure are identical to that described above. If electrical contact is desired between electrodes 20 and 22 and ones of CNTs 32 positioned thereover, an additional step of ultraviolet ozone cleaning can be applied to the appropriate areas on electrodes 20 and 22 after removal of the carrier liquid and excess CNTs.

Although only a few exemplary embodiments of this invention have been described in detail above, those skilled in the art would readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed as new and desired to be secured by Letters Patent of the United States is:

1. A method for the deposition and alignment of carbon nanotubes, comprising the steps of:
   providing an assembly that comprises a substrate having at least two electrodes supported thereon and opposing one another with a gap region being defined therebetween;
   depositing a carbon nanotube (CNT) attraction material on said substrate in said gap region;
   applying an electric potential to said two opposing electrodes wherein an electric field is generated across said gap region;
   wetting said CNT attraction material with a solution defined by a carrier liquid having carbon nanotubes (CNTs) suspended therein with said carrier liquid selected to minimize van der Waal forces between said CNTs suspended therein, wherein said carrier liquid is chosen to avoid clumping of said CNTs, wherein a first portion of said CNTs are aligned with said electric field and adhered to said CNT attraction material, and wherein a second portion of said CNTs are not adhered to said CNT attraction material; and
   removing said carrier liquid and said second portion of said CNTs from said assembly.

2. A method according to claim 1 wherein said step of removing comprises the step of blowing a gas over said assembly until said carrier liquid is no longer present thereon to thereby form a final assembly.

3. A method according to claim 2 wherein said step of removing further comprises the steps of:
   wetting said final assembly with a rinse liquid that can support suspension therein of any of said second portion of said CNTs remaining after said step of blowing;
   vibrating said wetted final assembly; and
   blowing a gas over said final assembly after being wetted and vibrated to remove said rinse liquid and any of said second portion of said CNTs suspended therein.

4. A method according to claim 3 wherein said rinse liquid is n-methylpyrolidone.

5. A method according to claim 3 wherein said gas used in each said step of blowing is nitrogen gas.

6. A method according to claim 3 wherein said step of vibrating comprises the step of transmitting acoustic wave energy towards said wetted final assembly.

7. A method according to claim 1 wherein said electric potential is one of AC potential and DC potential.

8. A method according to claim 1 wherein said CNTs are single-wall CNTs.

9. A method for the deposition and alignment of carbon nanotubes, comprising the steps of:
   providing an assembly that comprises a substrate having at least two electrodes supported thereon and opposing one another with a gap region being defined therebetween;
   depositing a CNT attraction material on at least portions of each of said two opposing electrodes and on said substrate in said gap region between said portions of each of said two opposing electrodes;
   applying an electric potential to said two opposing electrodes wherein an electric field is generated across said gap region;
   wetting said CNT attraction material with a solution defined by a carrier liquid having CNTs suspended therein with said carrier liquid selected to minimize van der Waal forces between said CNTs suspended therein, wherein said carrier liquid is chosen to avoid clumping of said CNTs, wherein a first portion of said CNTs are aligned with said electric field and adhered to said CNT attraction material, and wherein a second portion of said CNTs are not adhered to said CNT attraction material; and
   removing said electric potential, said carrier liquid and said second portion of said CNTs from said assembly.

10. A method according to claim 9 wherein said step of removing comprises the step of blowing a gas over said assembly until said carrier liquid is no longer present thereon to thereby form a final assembly.

11. A method according to claim 10 wherein said step of removing further comprises the steps of:
   wetting said final assembly with a rinse liquid that can support suspension therein of any of said second portion of said CNTs remaining after said step of blowing.

12. A method according to claim 11 wherein said rinse liquid is a n-methylpyrolidone.

13. A method according to claim 11 wherein said gas used in each said step of blowing is nitrogen gas.

14. A method according to claim 11 wherein said step of vibrating comprises the step of transmitting acoustic wave energy towards said wetted final assembly.

15. A method according to claim 9 wherein said electric potential is one of AC potential and DC potential.

16. A method according to claim 9 where said CNTs are single wall CNTs.

17. A method for he deposition and alignment of carbon nanotubes, comprising the steps of:
- providing an assembly that comprises a substrate having at least two electrodes supported thereon and opposing one another with a gap region being defined therebetween;
- depositing a monolayer material on said substrate in said gap region, said monolayer material being capable of forming at least one hydrogen bond with a sidewall of a carbon nanotube when coming into contact therewith;
- applying an electric potential to said two opposing electrodes wherein an electric field is generated across said gap region;
- wetting said monolayer material with a solution defined by a carrier liquid having CNTs suspended therein with said carrier liquid selected to minimize van der Waal forces between said CNTs suspended therein, wherein said carrier liquid is chosen to avoid clumping of said CNTs, wherein a first portion of said CNTs are aligned with said electric field, come into contact with said monolayer material and are bonded thereto, and wherein a second portion of said CNTs do not come into contact with said monolayer material and are not bonded thereto; and
- removing said carrier liquid and said second portion of said CNTs from said assembly.

18. A method according to claim 17 wherein said step of removing comprises the step of blowing a gas over said assembly until said carrier liquid is no longer present thereon to thereby form a final assembly.

19. A method according to claim 18 wherein said step of removing further comprises the steps of:
- wetting said final assembly with a rinse liquid that can support suspension therein of any of said second portion of said CNTs remaining after said step of blowing;
- vibrating said wetted final assembly; and
- blowing a gas over said final assembly after being wetted and vibrated to remove said rinse liquid and any of said second portion of said CNTs suspended therein.

20. A method according to claim 19 wherein said rinse liquid is a n-methylpyrolidone.

21. A method according to claim 19 wherein said gas used in each said step of blowing is nitrogen gas.

22. A method according to claim 19 wherein said step of vibrating comprises the step of transmitting acoustic wave energy towards said wetted final assembly.

23. A method according to claim 17 wherein said electric potential is one of AC potential and DC potential.

24. A method according to claim 17 wherein said CNTs are single-wall CNTs.

\* \* \* \* \*